(12) United States Patent
Zhang et al.

(10) Patent No.: US 11,703,361 B2
(45) Date of Patent: Jul. 18, 2023

(54) FIVE-DEGREE-OF-FREEDOM HETERODYNE GRATING INTERFEROMETRY SYSTEM

(71) Applicants: TSINGHUA UNIVERSITY, Beijing (CN); BEIJING U-PRECISION TECH CO., LTD., Beijing (CN)

(72) Inventors: Ming Zhang, Beijing (CN); Yu Zhu, Beijing (CN); Fuzhong Yang, Beijing (CN); Leijie Wang, Beijing (CN); Rong Cheng, Beijing (CN); Xin Li, Beijing (CN); Weinan Ye, Beijing (CN); Jinchun Hu, Beijing (CN)

(73) Assignees: BEIJING U-PRECISION TECH CO., LTD., Beijing (CN); TSINGHUA UNIVERSITY, Beijing (CN)

( * ) Notice: Subject to any disclaimer, the term of this patent is extended or adjusted under 35 U.S.C. 154(b) by 170 days.

(21) Appl. No.: 17/257,173

(22) PCT Filed: Jun. 26, 2019

(86) PCT No.: PCT/CN2019/092921
§ 371 (c)(1),
(2) Date: Dec. 30, 2020

(87) PCT Pub. No.: WO2020/007217
PCT Pub. Date: Jan. 9, 2020

(65) Prior Publication Data
US 2021/0262834 A1    Aug. 26, 2021

(30) Foreign Application Priority Data
Jul. 2, 2018   (CN) .......................... 201810708633.6

(51) Int. Cl.
*G01D 5/353*    (2006.01)
*G01D 5/34*    (2006.01)

(52) U.S. Cl.
CPC ........... *G01D 5/3537* (2013.01); *G01D 5/344* (2013.01)

(58) Field of Classification Search
CPC .. G01D 5/3537; G01D 5/344; G01B 2290/70; G01B 9/02003; G01B 9/02049; G01B 9/02027; G01B 11/02
See application file for complete search history.

(56) References Cited

U.S. PATENT DOCUMENTS

| 5,936,716 A | * | 8/1999 | Pinsukanjana ..... G01N 21/3103 117/86 |
| 6,020,964 A | | 2/2000 | Loopstra et al. |

(Continued)

FOREIGN PATENT DOCUMENTS

| CN | 103231016 A | 8/2013 |
| CN | 103630077 A | 3/2014 |

(Continued)

OTHER PUBLICATIONS

First Chinese Office Action and Search Report, dated May 27, 2019, China National Intellectual Property Administration.

*Primary Examiner* — Mohamed K Amara
(74) *Attorney, Agent, or Firm* — Holzer Patel Drenan

(57) ABSTRACT

A five-degree-of-freedom heterodyne grating interferometry system comprises: a single-frequency laser for emitting single-frequency laser light, the single-frequency laser light can be split into a reference light beam and a measurement light beam; an interferometer lens set and a measurement grating for converting the reference light and the measurement light into a reference interference signal and a measurement interference signal; and multiple optical fiber bundles respectively receiving the measurement interference signal and the reference interference signal, wherein each optical fiber bundle has multiple multi-mode optical fibers respectively receiving interference signals at different posi- (Continued)

tions on the same plane. The system is not over-sensitive to the environment, is small and light, and is easy to arrange. Six-degree-of-freedom ultra-precision measurement can be achieved by arranging multiple five-degree-of-freedom interferometry systems and using redundant information, thereby meeting the needs of a lithography machine worktable for six-degree-of-freedom position and orientation measurement.

9 Claims, 3 Drawing Sheets

(56) References Cited

U.S. PATENT DOCUMENTS

| | | | | |
|---|---|---|---|---|
| 6,687,010 | B1* | 2/2004 | Horii | G01B 9/0205 |
| | | | | 356/479 |
| 10,006,852 | B2* | 6/2018 | Diebold | G01N 15/1459 |
| 10,408,940 | B2* | 9/2019 | O'Keeffe | G01S 17/89 |
| 10,743,749 | B2* | 8/2020 | Yamada | A61B 5/0075 |
| 2004/0109164 | A1* | 6/2004 | Horii | G01B 9/0201 |
| | | | | 356/479 |
| 2006/0279793 | A1* | 12/2006 | Jurgensen | B41C 1/05 |
| | | | | 358/3.29 |
| 2007/0087445 | A1* | 4/2007 | Tearney | G01N 21/6408 |
| | | | | 436/172 |
| 2007/0206198 | A1* | 9/2007 | Serikawa | G01B 11/306 |
| | | | | 356/487 |
| 2012/0050748 | A1* | 3/2012 | Kuroda | G01D 5/266 |
| | | | | 356/499 |
| 2012/0224182 | A1* | 9/2012 | Tapanes | G01N 21/8806 |
| | | | | 356/477 |
| 2015/0062588 | A1* | 3/2015 | Tapanes | G02B 6/255 |
| | | | | 356/477 |

FOREIGN PATENT DOCUMENTS

| | | | | |
|---|---|---|---|---|
| CN | 103673899 | A | 3/2014 | |
| CN | 103759656 | A | 4/2014 | |
| CN | 103759657 | A | 4/2014 | |
| CN | 104439081 | A | 3/2015 | |
| CN | 105198475 | A | 12/2015 | |
| CN | 106017308 | A | 10/2016 | |
| CN | 106091940 | A | 11/2016 | |
| CN | 106152974 | A | 11/2016 | |
| CN | 106813578 | A | 6/2017 | |
| CN | 108106536 | A | 6/2018 | |
| CN | 207487599 | U | 6/2018 | |
| CN | 108627099 | A | 10/2018 | |
| EP | 0581871 | B2 * | 8/2009 | G01B 9/02 |
| JP | S4920025 | A | 2/1974 | |
| JP | S5353519 | A | 5/1978 | |
| WO | WO-2014005193 | A1 * | 1/2014 | A61B 1/00009 |

\* cited by examiner

FIVE-DEGREE-OF-FREEDOM HETERODYNE GRATING INTERFEROMETRY SYSTEM

TECHNICAL FIELD

The present disclosure relates to the technical field of interferometry, and more specifically, to a five-degree-of-freedom heterodyne grating interferometry system.

BACKGROUND ART

As a typical displacement sensor, an interferometry system has advantages of traceability to length, high measurement accuracy, large measurement range, large dynamic measurement range, easy installation and debugging, etc., and it is widely used in the field of precision and ultra-precision measurement, and commonly found in precision machinery and processing equipment. Currently, the interferometry system may be mainly divided into laser interferometry system and grating interferometry system. The laser interferometry system is based on the measurement principle of laser interference. The grating interferometry system is based on the principle of diffraction interference, the measuring basis is grating pitch, and the grating interferometry system has a relatively low sensitivity to environmental fluctuations and a higher repeated measurement accuracy.

Interferometers commonly used in industrial applications can only realize displacement measurement in a single direction. At present, the measurement accuracy of existing commercial interferometers can usually reach the nanometer level and achieve high measurement accuracy. However, in the actual measurement process, it is often affected by geometric installation errors such as Abbe error and cosine error, which may cause inaccurate measurement results; and additional displacement caused by a small rotation angle due to vibration cannot be avoided during the movement. With the continuous development of precision machinery, and continuous improvement of the motion indicators such as measurement accuracy, measurement distance and measurement speed and so on, the need for multi-degree-of-freedom measurement is gradually increasing, for example, in a position measurement system of an ultra-precision worktable of lithography machine.

To solve the above problems, conventional methods use a distributed multi-degree-of-freedom measurement system composed of several single-degree-of-freedom laser measurement systems. For example, US patent U.S. Pat. No. 6,020,964B2 (published on Feb. 1, 2000) from ASML of the Netherlands, US patent U.S. Pat. No. 6,980,279B2 (published on Dec. 27, 2005) from Nikon of Japan, and US patent U.S. Pat. No. 7,355,719B2 (published on Apr. 8, 2008) from Agilent of the United States all use similar six-degree-of-freedom measurement systems, that is, a multi-axis laser interferometer is arranged in a horizontal direction, a measurement light is introduced into the Z axis using a 45° reflector, the reflector is mounted on the side and in Z direction, a rotation angle is calculated by using the displacement difference, and thus six-degree-of-freedom measurement is realized. However, the distributed interferometry system takes up a lot of space and is difficult to install and adjust, thus cannot meet the measurement requirements. In the grating interferometry system, a two-degree-of-freedom measurement system is commonly used, for example, in US patent US0058173A1 (published on Mar. 15, 2007) from Heidenhain of Germany but cannot achieve simultaneous measurement of more degrees of freedom. Other grating interferometry systems, such as [C. B. Lee, G. H. Kim, and S. K. Lee, "Design and construction of a single unit multi-function optical encoder for a six-degree-of-freedom motion error measurement in an ultra-precision linear stage", Meas. Sci. Technol, 2011], a simple method for simultaneous measurement of six-degree-of-freedom proposed by Lee, etc. using PSD and a specific light path structure based on a two-degree-of-freedom grating interferometry system, have a more complex structure of the measurement system, the measurement of multi-degree of freedom depends on the specific light path structure, measurement consistency and stability are poor, the measurement accuracy is largely limited by the performance of a detector, and generally the rotation angle measurement accuracy can only reach an order of arc seconds, and the displacement measurement accuracy can only reach an order of micrometers, which is difficult to meet the performance requirements of ultra-precision measurement systems.

SUMMARY

In consideration of the limitations of the above-mentioned technical solutions, a precise five-degree-of-freedom heterodyne grating interferometry system, which has advantages such as simple and compact optical structure, easy actual installation and operation, and good stability and economy, is sought. The grating interferometry system may achieve the resolution of nanometer and sub-microradian and may simultaneously measure two linear displacements and three rotations with small strokes. The interferometry system may effectively reduce the shortcomings of the distributed interferometry system in the application of the ultra-precision worktable and improve the performance of the ultra-precision worktable of lithography machine. In addition, the grating interferometry system may also be applied to scenarios where large-stroke linear displacement and multi-degree-of-freedom measurement are required, for example, the precision measurement of multi-degree-of-freedom displacement of a worktable of a precision machine tool, a three-coordinate measuring machine, a semiconductor testing equipment, and so on.

The technical solution of the present disclosure is as follows:

A five-degree-of-freedom heterodyne grating interferometry system, including: a single-frequency laser 1 for emitting a single-frequency laser light, the single-frequency laser light may be split into a beam of reference light and a beam of measurement light; an interferometer lens set 3 and a measurement grating 4 for converting the reference light and the measurement light into a reference interference signal and a measurement interference signal; and multiple optical fiber bundles 5 receiving the measurement interference signal and the reference interference signal respectively, wherein each of the optical fiber bundles 5 has multiple multimode optical fibers receiving interference signals at different positions on a same plane respectively.

Further, the reference interference signal includes one path of reference interference signal, the measurement interference signal includes two paths of measurement interference signals; the two paths of measurement interference signals and the one path of reference interference signal are received via the optical fiber bundles 5 respectively, each of the optical fiber bundles 5 has four multimode optical fibers for receiving interference signals at different positions on the same plane respectively, each of the optical fiber bundles 5 outputs four optical signals, thus the total of the optical fiber bundles outputs twelve paths of optical signals.

Further, the measurement grating 4 may perform two-degree-of-freedom linear motions in horizontal and vertical directions and three angular motions with respect to the interferometer lens set 3.

Further, the interferometer lens set 3 sequentially includes, from one side to the other side, a refractor 35, a refractive element 33, a quarter wave plate 34, a beam splitter prism 31 and a polarization beam splitter prism 32, wherein the beam splitter prism 31 is disposed on the polarization beam splitter prism 32.

Further, the reference light is split into three beams after being incident to the beam splitter prism 31, and is used as reference lights of three paths of interference signals after being reflected by the polarization beam splitter prism 32.

The measurement light is split into three beams after being incident to the beam splitter prism 31, wherein two beams of measurement light are reflected by the polarization beam splitter prism 32, are sequentially incident to the quarter wave plate 34 and the refractive element 33, and then are incident to the measurement grating 4, diffracted by the grating 4 and return along an original optical path, and are incident to the polarization beam splitter prism 32 again and transmitted by the polarization beam splitter prism 32, then interfere with two paths of reference lights among the reference lights of the three paths of interference signals, thereby forming two paths of measurement interference signals.

The other beam of measurement light is reflected by the polarization beam splitter prism 32, incident to the quarter wave plate 34, then returns along an original optical path after being reflected by the reflector 35, and is incident to the quarter wave plate 34 and the polarization beam splitter prism 32 again and transmitted by the polarization beam splitter prism 32, then interferes with the other path of reference light among the reference lights of the three paths of interference signals, thereby forming one path of reference interference signal.

Further, components of the interferometer lens set 3 are closely adjacent and fixed and are integrated into an integrated structure.

Further, a cross section of the refractive element 33 is an isosceles trapezoid, and the measurement light is refracted when transmitted through both sides of the trapezoid and reflected when transmitted through a top of the trapezoid.

Further, after being incident to the refractive element 33, the two beams of measurement light are incident to the measurement grating 4 in an incident light path at a specific angle, the specific angle makes a diffracted light path coincide with the incident light path, and the diffracted light path passes through the refractive element 33 to interfere in parallel with two paths of reference lights among the reference lights of the three paths of interference signals, thereby forming two paths of measurement interference signals.

Further, the grating interferometry system further includes an acousto-optic modulator 2 for frequency shifting of the split single-frequency laser.

Further, the grating interferometry system further includes a photoelectric conversion unit 6 and an electronic signal processing component 7, wherein: the photoelectric conversion unit 6 receives the optical signals transmitted by the optical fiber bundles 5 and convert the optical signals into electrical signals for input to the electronic signal processing component 7.

the electronic signal processing component 7 receives the electrical signals to calculate a linear displacement and/or an angular motion of the measurement grating 4.

Compared with the prior art, the five-degree-of-freedom heterodyne grating interferometry system provided by the present disclosure has the following advantages.

(1) The interferometry system of the present disclosure can realize simultaneous measurement of five-degree-of-freedom including two translational displacements and three rotation angles, and, while greatly improving the measurement efficiency, the environmental sensitivity is low, the measurement signal is easy to process, and the resolution and precision can reach nanometers level or even higher.

(2) The interferometry system of the present disclosure has a small size and high integration, which effectively improves the space utilization rate and the integration of the whole application system.

(3) Compared with the conventional multi-degree-of-freedom interferometry system, on the basis of meeting requirements of the measurement accuracy, the interferometry system of the present disclosure can effectively avoid the influence of the geometric installation error between the interferometer and the motion unit in single degree of freedom measurement.

BRIEF DESCRIPTION OF THE DRAWINGS

The above and other objects and results of the present disclosure will become more apparent and easier to be understood by the following specific embodiments and the claims with reference to the accompanying drawings.

REFERENCE NUMERALS

Figure 1:
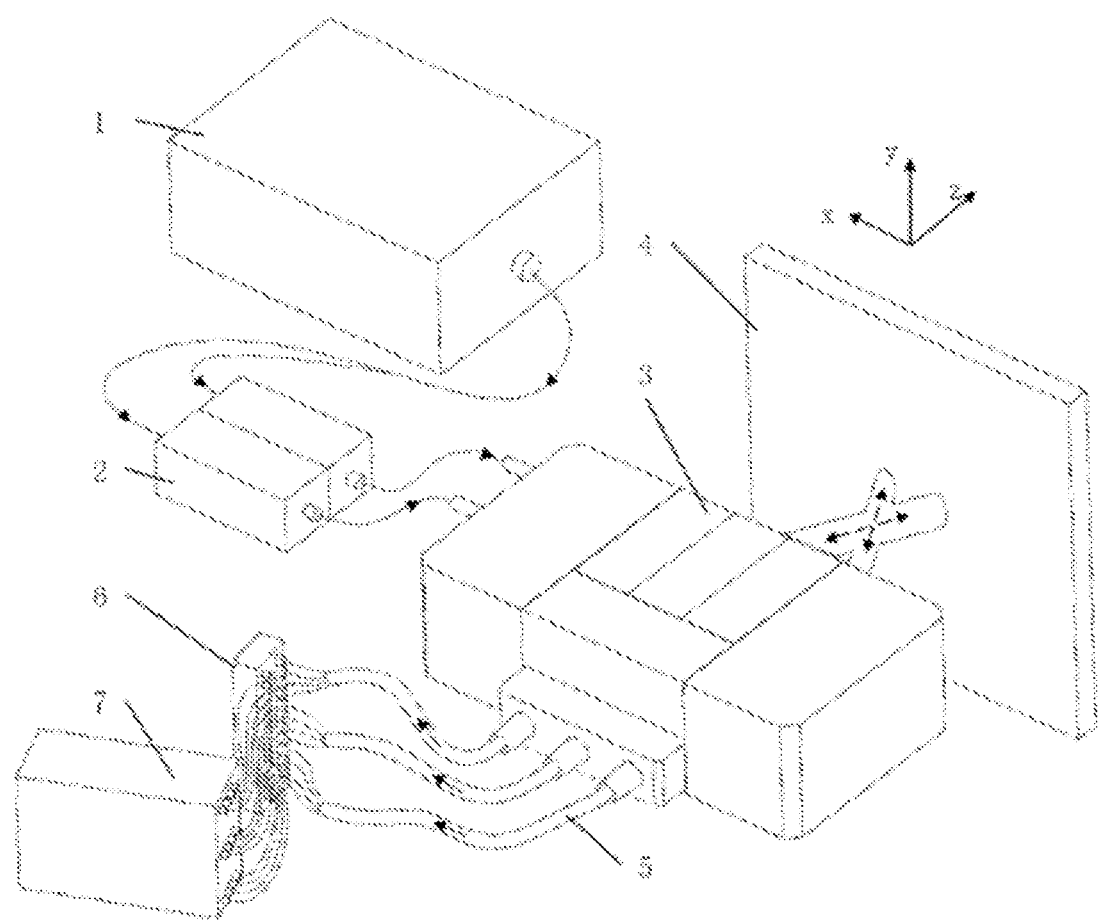
FIG. 1 is a schematic view illustrating the five-degree-of-freedom heterodyne grating interferometry system of the present disclosure.

1: single-frequency laser;
2: acousto-optic modulator;
3: interferometer lens set;
4: measurement grating;
5: optical fiber bundle;
6: photoelectric conversion unit;
7: electronic signal processing component;
31: beam splitter prism;
32: polarization beam splitter prism;
33: refractive element;
34: quarter wave plate; and
35: reflector.

DETAILED DESCRIPTION OF THE EMBODIMENTS

The technical solutions of the present disclosure will be clearly and completely described below in conjunction with the accompanying drawings. Obviously, the embodiments described herein are only part of the embodiments of the present disclosure, rather than all of them. Based on the embodiments of the present disclosure, all other embodiments obtained by those of ordinary skill in the art without creative work shall fall within the protection scope of the present disclosure.

In the description of the present disclosure, it should be noted that the orientation or positional relationship indicated by terms such as "center", "upper", "lower", "left", "right", "vertical", "horizontal", "inside" and "outside" is based on the orientation or positional relationship shown in the drawings, which is merely for the convenience of describing the present disclosure and simplifying the description, rather than indicating or implying that the indicated device or element must have a specific orientation or be configured and operated in a specific orientation, and therefore should not be understood as a limitation to the present disclosure. Further, terms such as "first", "second" and "third" are only used for the purpose of description and should not be understood as indicating or implying relative importance.

In the description of the present disclosure, it should be noted that terms such as "install", "connect" and "couple" should be understood in a broad sense, unless otherwise explicitly specified and limited. For example, components may be fixedly connected, detachably connected or integrally connected; may be mechanically connected or electrically connected; may be directly connected, or may be indirectly connected through an intermediate medium, and there may be an internal communication between two components. For those of ordinary skill in the art, the specific meanings of the above terms in the present disclosure can be understood according to specific circumstances.

FIG. 1 is a schematic view illustrating the five-degree-of-freedom heterodyne grating interferometry system of the present disclosure. As shown in FIG. 1, the five-degree-of-freedom heterodyne grating interferometry system includes a single-frequency laser 1, an acousto-optic modulator 2, an interferometer lens set 3, a measurement grating 4, optical fiber bundles 5, a photoelectric conversion unit 6, and an electronic signal processing component 7. Preferably, the measurement grating 4 is a one-dimensional reflection type grating.

Figure 2:
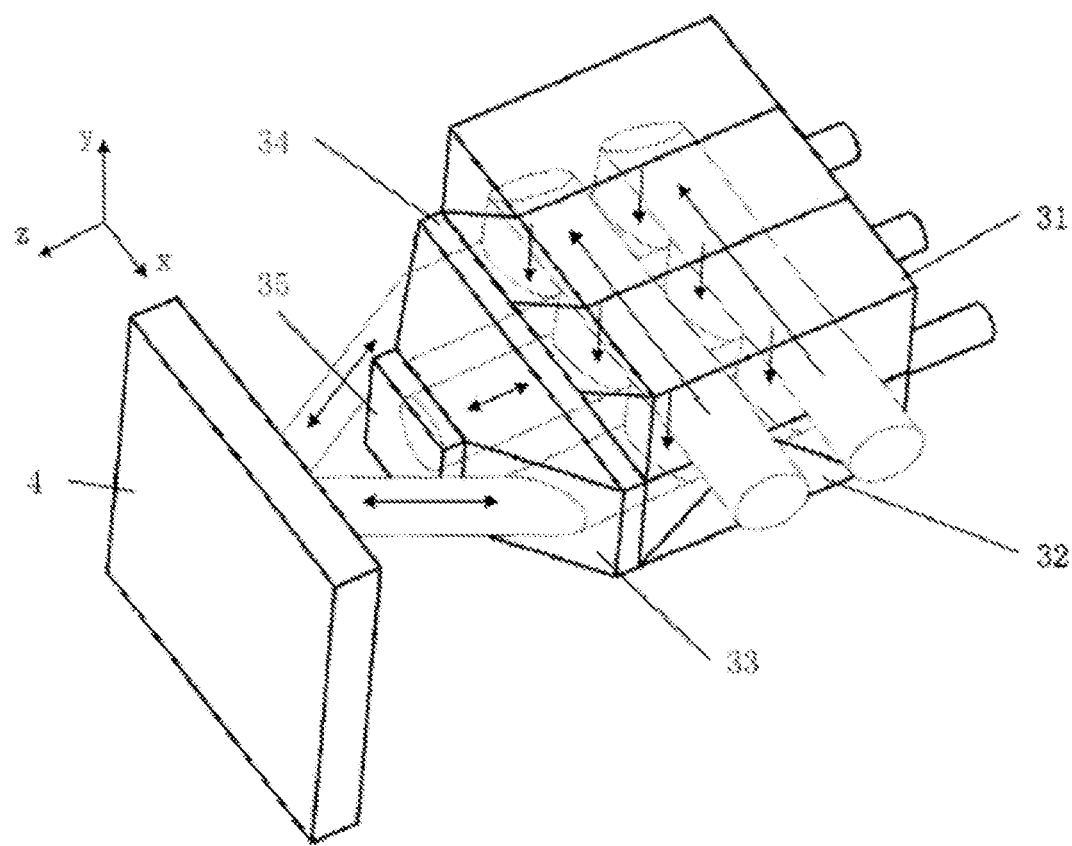
FIG. 2 is a schematic view illustrating the structure of the interferometer lens set of the present disclosure.

FIG. 2 is a schematic view illustrating the structure of the interferometer lens set of the present disclosure. As shown in FIG. 2, the interferometer lens set 3 includes, in order from one side to the other side (in FIG. 2, from left side to right side, or from a side close to the measurement grating 4 to the other side): a reflector 35, a refractive element 33, a quarter wave plate 34, a beam splitter prism 31, and a polarization beam splitter prism 32. The beam splitter prism 31 is disposed on the polarization beam splitter prism 32, that is, the beam splitter prism 31 is disposed on an upper portion of the interferometer lens set, the polarization beam splitter prism 32 is disposed on a lower portion of the interferometer lens set, and the refractive element 33 is disposed near the top of one side of the interferometer lens set (in FIG. 2, near the top on the left side). To achieve a high degree of integration, preferably, components of the interferometer lens set 3 are fixed compactly and adjacently and are integrated into an integrated structure, and more preferably, the components are fixed by bonding.

Figure 3:
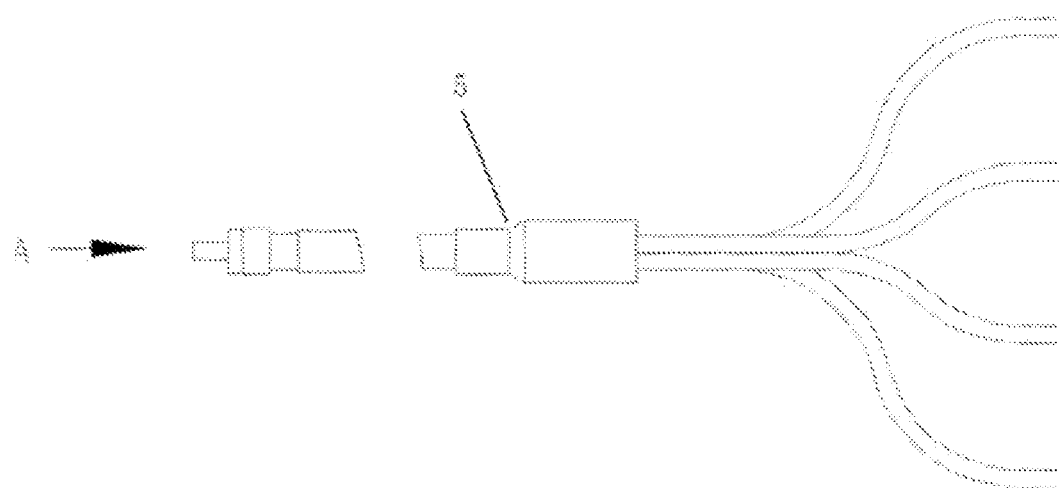
FIG. 3 is a schematic view illustrating an optical fiber bundle of the present disclosure.
Figure 4:
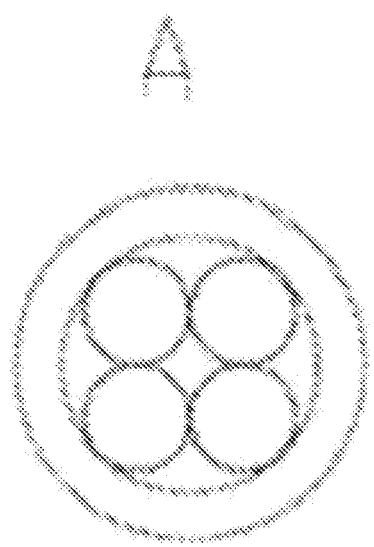
FIG. 4 is a schematic view illustrating FIG. 3 of the present disclosure in direction A.

FIG. 3 is a schematic view illustrating an optical fiber bundle of the present disclosure, and FIG. 4 is a schematic view illustrating FIG. 3 of the present disclosure in direction A. As shown in FIGS. 3 and 4, each of the optical fiber bundles 5 includes four multimode optical fibers, which are disposed at different positions in the same plane, used to receive interference signals at different spatial positions, and four independent optical signals are generated via optical fiber transmission.

The principle of the grating interferometry system will be explained in detail with reference to FIG. 1 and FIG. 2, specifically:

The single-frequency laser 1 emits a single-frequency light, the single-frequency light is coupled by the optical fiber, split by a beam splitter, and then is incident to the acousto-optic modulator 2 for frequency shifting, and after collimated by the Green lens, two paths of polarized lights (s light) with frequency difference are obtained, one path of which is used as a reference light and the other path as a measurement light.

The reference light is split twice by the upper portion of the beam splitter prism 31, then three beams of laser are obtained, which are used as reference lights of the three paths of interference signals after being incident downward and reflected by the polarization beam splitter prism.

The measurement light is split by the beam splitter prism 31 and also obtains three beams of laser incident downward. Two beams thereof are reflected by the polarization beam splitter prism 32, then are incident to the quarter wave plate 34 and deflected by the refractive element 33 sequentially, and then are incident to the measurement grating 4, and, after being diffracted by the grating, ±1 orders diffracted lights include the rotation angle and displacement information of the grating, the two beams return along an original optical path, and are incident to the quarter wave plate 34 and the polarization beam splitter prism 32 again and transmitted by the polarization beam splitter prism 32, then interfere with the reference lights, thereby forming two paths of measurement interference signals. The other beam thereof is reflected by the polarization beam splitter prism 32, then is incident to the quarter wave plate 34 and reflected by the reflector 35 sequentially, and returns along an original optical path, and is incident to the quarter wave plate 34 and the polarization beam splitter prism 32 again and is transmitted by the polarization beam splitter prism 32, then interfere with the reference light, thereby forming a reference interference signal.

Preferably, the light path of the present disclosure is arranged in Littrow type, that is, the measurement lights are deflected after being incident to the refractive element 33, and the deflected measurement lights are incident to the measurement grating 4 at a specific angle such that the diffracted light path coincides with the incident light path, and the diffracted light path passes through the refractive element 33 and forms the measurement light parallel to the reference light, then the lights are incident to the quarter wave plate 34 and the polarization beam splitter prism 32 again and transmitted by the polarization beam splitter prism 32, to interfere with the reference lights, thereby forming two paths of measurement signals.

The two paths of measurement interference signals and one path of reference interference signal are received by three optical fiber bundles 5 respectively. Each of the optical fiber bundles includes four multimode optical fibers therein for collecting optical signals of the same interference signal at different spatial positions. There are a total of twelve optical fibers and there form a total of twelve paths of signals, which are transmitted to the photoelectric conversion unit 6 to be converted into electrical signals and input to the electronic signal processing component 7 for processing. Using the obtained phase information, information about rotation angle of the grating may be calculated based on the differential wavefront principle, the measurement of three rotation angles may be realized at the same time. A phase caused by the additional displacement is compensated according to the obtained rotation angle, and the linear motion with two degrees of freedom is solved. When the measurement grating 4 performs two-degree-of-freedom linear motions in horizontal and vertical directions and three angular motions with respect to the interferometer lens set 3, the electronic signal processing component 7 will output two-degree-of-freedom linear displacement and angular motion.

The expression of the five-degree-of-freedom motion calculation is as follows:

$$\theta_x = \frac{(\phi_1 + \phi_2 + \phi_5 + \phi_6) - (\phi_3 + \phi_4 + \phi_7 + \phi_8)}{\Gamma_x}$$

$$\theta_y = \frac{(\phi_1 + \phi_3 + \phi_5 + \phi_7) - (\phi_2 + \phi_4 + \phi_6 + \phi_8)}{\Gamma_y}$$

$$\theta_z = \frac{(\phi_1 + \phi_2 + \phi_7 + \phi_8) - (\phi_3 + \phi_4 + \phi_5 + \phi_6)}{\Gamma_z}$$

$$x = \left[\frac{(\phi_1 + \phi_2 + \phi_3 + \phi_4) - (\phi_5 + \phi_6 + \phi_7 + \phi_8)}{4} + \phi_{x\theta}\right] \times \frac{p}{4\pi}$$

$$z = \left[\frac{(\phi_1 + \phi_2 + \phi_3 + \phi_4) + (\phi_5 + \phi_6 + \phi_7 + \phi_8)}{4} + \phi_{z\theta}\right] \times \frac{\lambda}{8\pi \cos\theta}$$

Wherein, $\theta_{x,y,z}$ are rotation angles of the grating, x, z are grating displacements, $\phi_{1,2,3,4,5,6,7,8}$ are electronic signal processing card readings, $\Gamma_{x,y,z}$ are calibration constants, $\phi_{x\theta,z\theta}$ are additional displacement compensation phases, p is a grating pitch, 2 is a laser wavelength, and B is a Littrow angle.

The interferometry system and structure scheme provided in the above embodiments can realize simultaneous measurement of three rotational degrees of freedom and two linear degrees of freedom, and the system has a short measurement optical path and is minimally affected by the environment. The interferometry system using optical fiber bundles may effectively reduce the number of system components, improve the anti-interference ability and system integration of the system, it is easy to process the measurement signal, and the measurement resolution of the rotation angle can reach microradians, the measurement resolution of the linear displacement can reach nm level; also, the grating interferometer system has advantages such as simple structure, small size, light weight, easy installation and arrangement, convenient application. When the system is applied to the displacement measurement of an ultra-precision worktable of lithography machine, compared with the laser interferometer measurement system, it can effectively reduce the volume and mass of the worktable on the basis of meeting the measurement requirements, greatly improve the dynamic performance of the worktable, and thus comprehensively improve the overall performance of the worktable. The five-degree-of-freedom heterodyne grating interferometry system may also be applied to precision measurement of multi-degree-of-freedom displacements of worktable of a precision machine tool, a three-coordinate measuring machine, a semiconductor testing equipment, etc. Six-degree-of-freedom ultra-precision measurement may be achieved by arranging multiple five-degree-of-freedom interferometry system and using redundant information, thereby meeting the needs of a worktable of lithography machine for six-degree-of-freedom position and attitude measurement.

Although the foregoing disclosure shows exemplary embodiments of the present disclosure, it should be noted that various changes and modifications can be made without departing from the scope defined by the claims. In addition, although the elements of the present disclosure may be described or required in individual forms, it is also conceivable to have multiple elements, unless explicitly limited to a single element.

What is claimed is:

1. A five-degree-of-freedom heterodyne grating interferometry system, comprising:
    a single-frequency laser for emitting a single-frequency laser light, the single-frequency laser light is split into a beam of reference light and a beam of measurement light;
    an interferometer lens set and a measurement grating for converting the reference light and the measurement light into a reference interference signal and a measurement interference signal; and
    multiple optical fiber bundles receiving the measurement interference signal and the reference interference signal respectively, wherein each of the optical fiber bundles has multiple multimode optical fibers receiving interference signals at different positions on a same plane respectively;
    wherein the reference interference signal comprises one path of the reference interference signal, the measurement interference signal comprises two paths of the measurement interference signals, the two paths of measurement interference signals and the one path of the reference interference signal are received via the optical fiber bundles respectively, and
    wherein each of the optical fiber bundles has four multimode optical fibers for receiving interference signals at different positions on the same plane respectively, each of the optical fiber bundles outputs four optical signals, thus a total of the optical fiber bundles outputs twelve paths of optical signals.

2. The grating interferometry system according to claim 1, wherein the measurement grating performs two-degree-of-freedom linear motions in horizontal and vertical directions and three angular motions, with respect to the interferometer lens set.

3. The grating interferometry system according to claim 1, wherein the interferometer lens set sequentially comprises, from one side to another side, a refractor, a refractive element, a quarter wave plate, a beam splitter prism and a polarization beam splitter prism, wherein the beam splitter prism is disposed on the polarization beam splitter prism.

4. The grating interferometry system according to claim 3, wherein:
    the reference light is split into three beams after being incident to the beam splitter prism, and is used as reference lights of three paths of interference signals after being reflected by the polarization beam splitter prism;
    the measurement light is split into three beams after being incident to the beam splitter prism, wherein two of the three beams of the measurement light are reflected by the polarization beam splitter prism, are sequentially incident to the quarter wave plate and the refractive element, and then are incident to the measurement grating, diffracted by the grating and return along an original optical path, and are incident to the polarization beam splitter prism again and transmitted by the polarization beam splitter prism, and then interfere with two paths of reference lights among the reference lights of the three paths of interference signals, thereby forming two paths of measurement interference signals; and
    the remaining one of the three beams of measurement light beam is reflected by the polarization beam splitter prism, incident to the quarter wave plate, and then returns along an original optical path after being reflected by the refractor, and is incident to the quarter wave plate and the polarization beam splitter prism again and transmitted by the polarization beam splitter prism, and then interferes with the other path of reference light among the reference lights of the three paths of interference signals, thereby forming one path of reference interference signal.

5. The grating interferometry system according to claim 4, wherein after being incident to the refractive element, the two beams of measurement light are incident to the measurement grating in an incident light path at a specific angle, the specific angle makes a diffracted light path coincide with the incident light path, and the diffracted light path passes through the refractive element to interfere in parallel with two paths of reference lights among the reference lights of the three paths of interference signals, thereby forming two paths of measurement interference signals.

6. The grating interferometry system according to claim 3, wherein components of the interferometer lens set are closely adjacent and fixed and are integrated into an integrated structure.

7. The grating interferometry system according to claim 3, wherein a cross section of the refractive element is an isosceles trapezoid, wherein upon transmission of the measurement light through both sides of the trapezoid, the measurement light is refracted, and upon transmission of the measurement light through a top of the trapezoid, the measurement light is reflected.

8. The grating interferometry system according to claim 1, further comprising:
an acousto-optic modulator for frequency shifting of the split single-frequency laser.

9. The grating interferometry system according to claim 1, further comprising:
a photoelectric conversion unit and an electronic signal processing component, wherein:
the photoelectric conversion unit receives the optical signals transmitted by the optical fiber bundle and converts the optical signals into electrical signals, and inputs the electrical signals to the electronic signal processing component;
the electronic signal processing component receives the electrical signals to calculate one or both of a linear displacement and an angular motion of the measurement grating.

\* \* \* \* \*